United States Patent
Saito et al.

(10) Patent No.: US 12,340,948 B2
(45) Date of Patent: Jun. 24, 2025

(54) MULTILAYER CERAMIC CAPACITOR

(71) Applicant: TAIYO YUDEN CO., LTD., Tokyo (JP)

(72) Inventors: Masaki Saito, Tokyo (JP); Keisuke Ishii, Tokyo (JP); Takayuki Hattori, Tokyo (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 88 days.

(21) Appl. No.: 18/168,766

(22) Filed: Feb. 14, 2023

(65) Prior Publication Data

US 2023/0268131 A1 Aug. 24, 2023

(30) Foreign Application Priority Data

Feb. 22, 2022 (JP) ................................ 2022-025229

(51) Int. Cl.
*H01G 4/30* (2006.01)
*H01G 4/012* (2006.01)
*H01G 4/248* (2006.01)

(52) U.S. Cl.
CPC ............... *H01G 4/30* (2013.01); *H01G 4/012* (2013.01); *H01G 4/248* (2013.01)

(58) Field of Classification Search
CPC ............ H01G 4/30; H01G 4/32; H01G 4/012; H01G 4/248
See application file for complete search history.

(56) References Cited

U.S. PATENT DOCUMENTS

| | | | |
|---|---|---|---|
| 2010/0128413 A1* | 5/2010 | Takashima | H01G 4/38 361/306.3 |
| 2012/0073129 A1* | 3/2012 | Abe | H01G 4/30 29/825 |
| 2014/0240895 A1* | 8/2014 | Lee | H01G 4/12 29/25.42 |
| 2015/0075854 A1* | 3/2015 | You | H01G 4/35 361/275.1 |
| 2016/0042867 A1 | 2/2016 | Kisumi | |
| 2017/0213647 A1* | 7/2017 | Ahn | H01G 4/012 |
| 2017/0345571 A1* | 11/2017 | Imaeda | H01G 4/248 |

FOREIGN PATENT DOCUMENTS

WO 2014/175034 A1 10/2014

* cited by examiner

*Primary Examiner* — Michael P McFadden
(74) *Attorney, Agent, or Firm* — CHEN YOSHIMURA LLP

(57) ABSTRACT

A multilayer ceramic capacitor includes a ceramic body including an electrode-stacked portion having first and second internal electrodes that are alternately stacked along a first axis direction, wherein the first internal electrodes include a first inner-layer internal electrode and a first outer-layer internal electrode that is absent at and adjacent to a position corresponding to at least one of four corners of the first inner-layer internal electrode, the second internal electrodes include a second inner-layer internal electrode and a second outer-layer internal electrode that is absent at and adjacent to a position corresponding to at least one of four corners of the second inner-layer internal electrode, and the electrode-stacked portion includes a pair of outer layer portions where the first and second outer-layer internal electrodes are stacked, and an inner layer portion positioned between the outer layer portions and where the first and second inner-layer internal electrodes are stacked.

5 Claims, 16 Drawing Sheets

MULTILAYER CERAMIC CAPACITOR

FIELD

A certain aspect of the present disclosure relates to a multilayer ceramic capacitor.

BACKGROUND

In International Publication No. 2014/175034 (Patent Document 1), there is a description about a phenomenon in which when external electrodes containing Cu as a main component are baked on a ceramic body having internal electrodes containing Ni as a main component, Cu in the external electrodes diffuse into the internal electrodes while reacting with Ni. Because of this phenomenon, the ceramic body expands at the end portions of the internal electrodes that are close to the external electrodes.

In the ceramic body, only the section close to the external electrode tends to expand in the stack direction because of such expansion of the internal electrodes. In the ceramic body, an internal stress generated thereby is concentrated on a corner portion, so that a crack is more likely to be generated. The generation of such cracks is more significant in a high-height ceramic body having a large number of stacked internal electrodes.

In the multilayer ceramic capacitor, it is effective to lower the baking temperature of the external electrodes onto the ceramic body in order to inhibit the diffusion of Cu in the external electrodes into the internal electrodes. That is, since the reaction rate between Cu and Ni is decreased by lowering the baking temperature, the diffusion of Cu into the internal electrodes can be inhibited.

RELATED ART DOCUMENTS

Patent Documents

International Publication No. 2014/175034

SUMMARY

However, when the baking temperature of the external electrodes onto the ceramic body is lowered, it becomes difficult for the external electrodes to be sufficiently sintered. As a result, in the multilayer ceramic capacitor, problems such as a decrease in long-term reliability due to a decrease in denseness of the external electrodes and insufficient connection strength between each of the external electrodes and the ceramic body are likely to occur.

Therefore, an object of the present disclosure is to inhibit generation of cracks in a high-height ceramic body.

In one aspect of the present disclosure, there is provided a multilayer ceramic capacitor including: a ceramic body including an electrode-stacked portion and a pair of cover portions, the electrode-stacked portion having a plurality of first internal electrodes and a plurality of second internal electrodes, the plurality of first internal electrodes and the plurality of second internal electrodes being alternately stacked along a direction of a first axis, the plurality of first internal electrodes being led out to a first end surface of the ceramic body that is perpendicular to a second axis orthogonal to the first axis, the plurality of second internal electrodes being led out to a second end surface of the ceramic body that is perpendicular to the second axis, the plurality of first internal electrodes and the plurality of second internal electrodes containing Ni as a main component, the pair of cover portions covering the electrode-stacked portion from respective sides in the direction of the first axis and respectively constituting first and second principal surfaces of the ceramic body perpendicular to the first axis, a dimension in the direction of the first axis of the ceramic body being equal to or greater than 1.5 times a dimension in a direction of a third axis orthogonal to the first axis and the second axis; first and second external electrodes that include first and second end-surface covering portions and first and second extending portions, respectively, and contain Cu as a main component, the first and second end-surface covering portions covering the first and second end surfaces, respectively, of the ceramic body, the first extending portion extending from the first end-surface covering portion to the first and second principal surfaces of the ceramic body, and the second extending portion extending from the second end-surface covering portion to the first and second principal surfaces of the ceramic body, wherein the plurality of first internal electrodes include a first inner-layer internal electrode and a first outer-layer internal electrode, the first inner-layer internal electrode having a rectangular planar shape having four corners, the first outer-layer internal electrode being shaped so as to be absent at and adjacent to a position corresponding to at least one of four corners of the first inner-layer internal electrode in a plan view, wherein the plurality of second internal electrodes include a second inner-layer internal electrode and a second outer-layer internal electrode, the second inner-layer internal electrode having a rectangular planar shape having four corners, the second outer-layer internal electrode being shaped so as to be absent at and adjacent to a position corresponding to at least one of four corners of the second inner-layer internal electrode in the plan view, wherein the first and second internal electrodes have the same rectangular planar shape with 180 degrees different orientations in the plan view, and the first and second outer-layer internal electrodes have the same planar shape with 180 degrees different orientations in the plan view, and wherein the electrode-stacked portion includes a pair of outer layer portions that are adjacent to the pair of cover portions, respectively, in which the first and second outer-layer internal electrodes are stacked, and an inner layer portion positioned between the pair of outer layer portions in which the first and second inner-layer internal electrodes are stacked.

In the above multilayer ceramic capacitor, the patterns of the outer-layer internal electrodes stacked on the outer-layer portion in the electrode-stacked portion are made to be different from the patterns of the inner-layer internal electrodes stacked on the inner layer portion, whereby the electrode-absence sections where no internal electrodes are present can be provided in the vicinities of the corner portions of the ceramic body. As a result, in the above multilayer ceramic capacitor, even when the internal electrodes expand because of diffusion of Cu in the external electrodes, stress is less likely to concentrate at the corner portions of the ceramic body. Therefore, in the above multilayer ceramic capacitor, it is possible to inhibit cracks from being generated in the corner portions of the ceramic body.

The first and second outer-layer internal electrodes may each be shaped so as to be absent at and adjacent to each of positions corresponding to the four corners of the first and second inner-layer internal electrodes, respectively.

The first outer-layer internal electrode may be shaped to have a relatively narrowed portion that is narrowed in the direction of the third axis in an entire region that overlaps with the first extending portion of the first external electrode in the direction of the first axis in the plan view, and the second outer-layer internal electrode may be shaped to have a relatively narrowed portion that is narrowed in the direction of the third axis in an entire region that overlaps with the second extending portion of the second external electrode in the direction of the first axis in the plan view.

In the first outer-layer internal electrode, a dimension in the direction of the third axis of the relatively narrowed portion may be equal to or less than two-thirds of that of the first inner-layer internal electrode, and in the second outer-layer internal electrode, a dimension in the direction of the third axis of the relatively narrowed portion may be equal to or less than that of the second inner-layer internal electrode.

The first outer-layer internal electrode may be shaped so as not to overlap with the second extending portion of the second external electrode in the direction of the first axis in the plan view, and the second outer-layer internal electrode may be shaped so as not to overlap with the first extending portion of the first external electrode in the direction of the first axis in the plan view.

DETAILED DESCRIPTION

Figure 1:
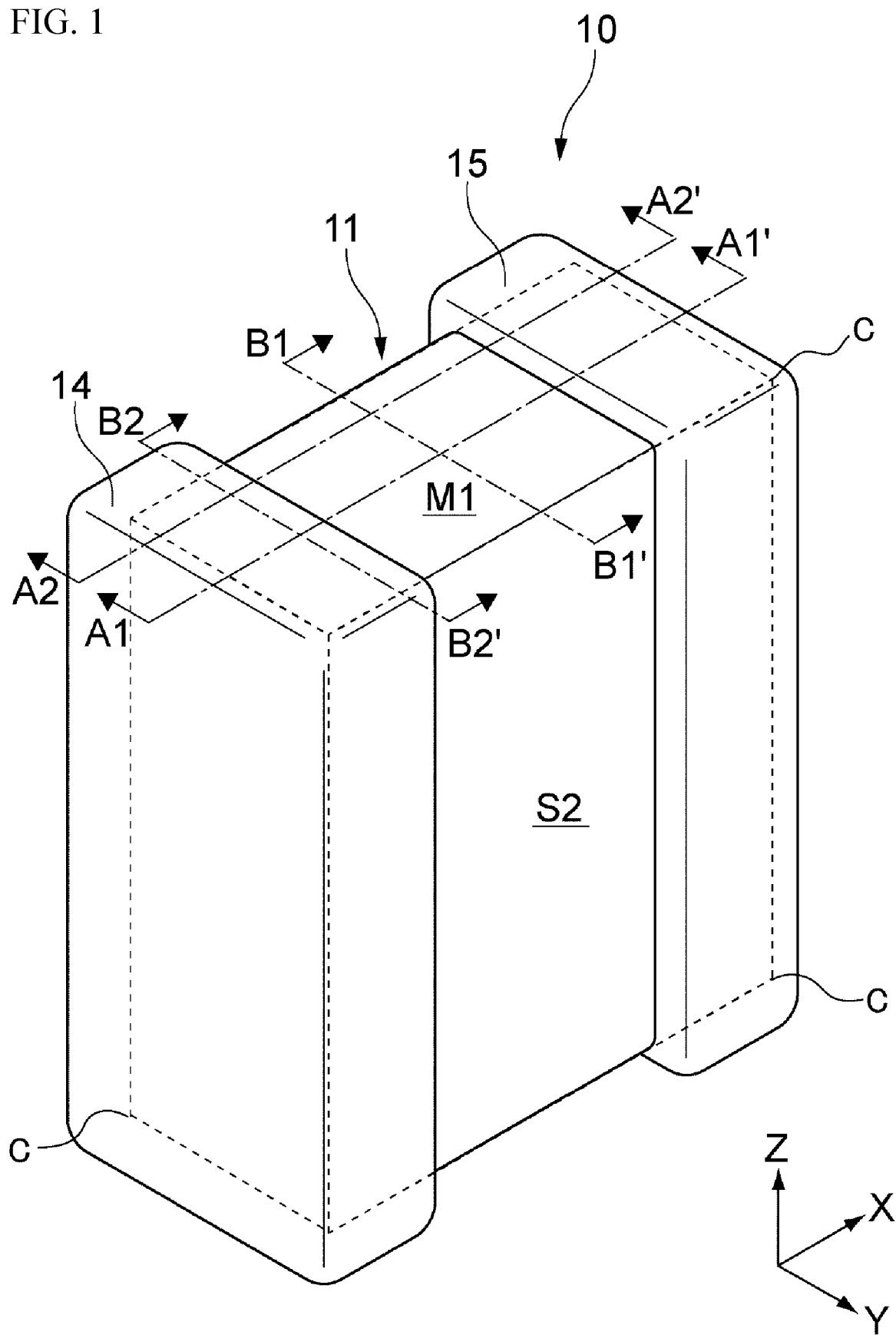
FIG. 1 is a perspective view of a multilayer ceramic capacitor in accordance with an embodiment.

Hereinafter, a multilayer ceramic capacitor 10 in accordance with an embodiment will be described with reference to the drawings. In the drawings, an X-axis, a Y-axis, and a Z-axis orthogonal to each other are illustrated as appropriate. The X-axis, the Y-axis, and the Z-axis define a fixed coordinate system that is fixed with respect to the multilayer ceramic capacitor 10.

Configuration of the Multilayer Ceramic Capacitor 10

Figure 2:
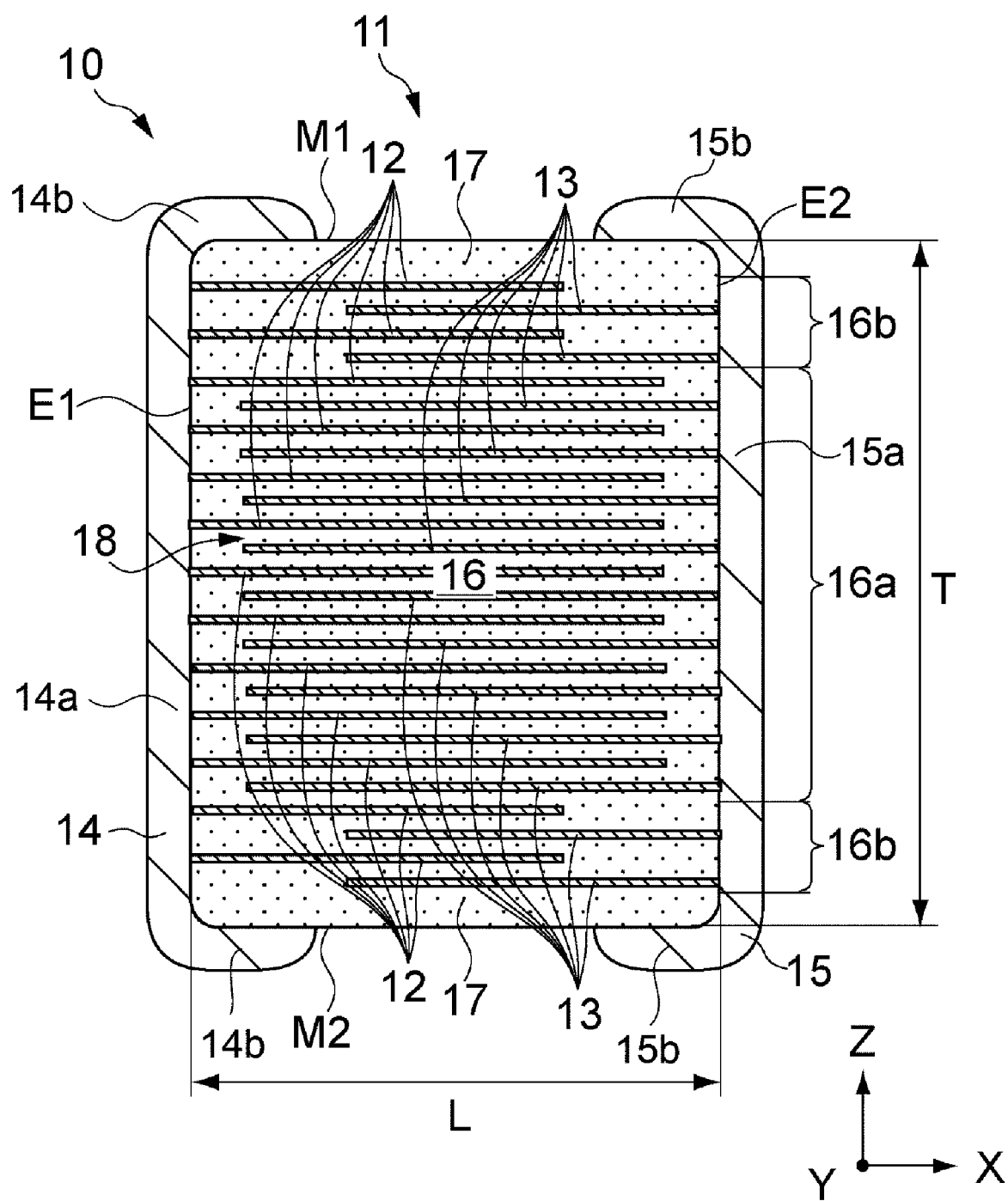
FIG. 2 is a cross-sectional view of the multilayer ceramic capacitor taken along line A1-A1' in FIG. 1.
Figure 3:
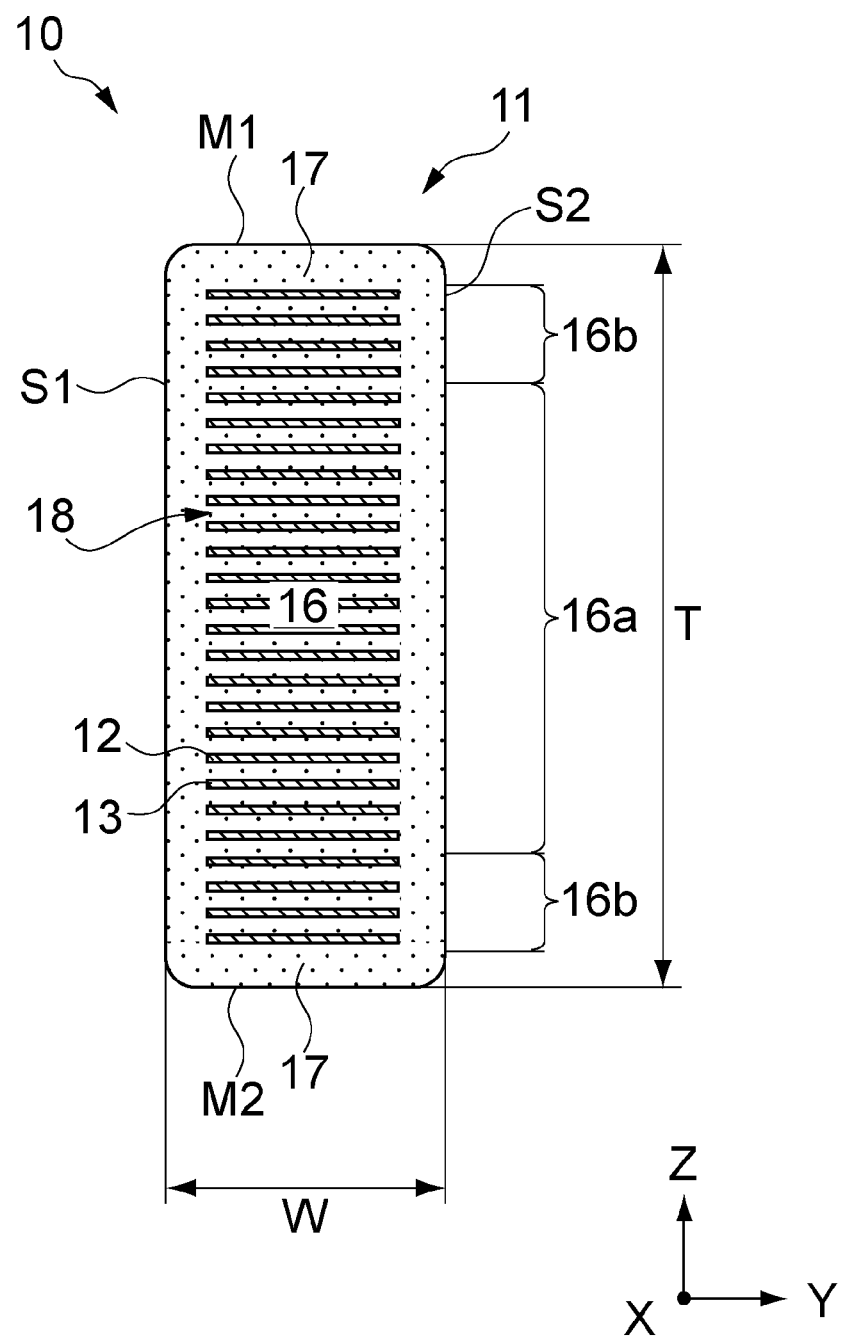
FIG. 3 is a cross-sectional view of the multilayer ceramic capacitor taken along line B1-B1' in FIG. 1.

FIG. 1 to FIG. 3 illustrate the multilayer ceramic capacitor 10 in accordance with the embodiment. FIG. 1 is a perspective view of the multilayer ceramic capacitor 10. FIG. 2 is a cross-sectional view of the multilayer ceramic capacitor 10 taken along the line A1-A1' in FIG. 1. FIG. 3 is a cross-sectional view of the multilayer ceramic capacitor 10 taken along the line B1-B1' in FIG. 1.

FIG. 2 and FIG. 3 illustrate longitudinal cross sections of the section including a center portion of the multilayer ceramic capacitor 10. Specifically, FIG. 2 illustrates a cross section taken along the X-Z plane of the center portion in the Y-axis direction of the multilayer ceramic capacitor 10. FIG. 3 illustrates a cross section taken along the Y-Z plane of the center portion in the X-axis direction of the multilayer ceramic capacitor 10.

The multilayer ceramic capacitor 10 includes a ceramic body 11, a first external electrode 14, and a second external electrode 15. The ceramic body 11 is configured as a hexahedron having first and second principal surfaces M1 and M2 orthogonal to the Z-axis, first and second end surfaces E1 and E2 orthogonal to the X-axis, and a pair of side surfaces S1 and S2 orthogonal to the Y-axis.

All of the principal surfaces M1 and M2, the end surfaces E1 and E2, and the side surfaces S1 and S2 of the ceramic body 11 are flat surfaces. The flat surface according to the present embodiment does not have to be strictly flat as long as it is a surface recognized as being flat when viewed as a whole, and includes, for example, a surface having fine unevenness, a surface having a gently curved shape within a predetermined range, or the like.

The multilayer ceramic capacitor 10 includes the high-height ceramic body 11 in which a dimension T in the Z-axis direction is equal to or greater than 1.5 times a dimension W in the Y-axis direction. That is, the multilayer ceramic capacitor 10 can be mounted in a mounting space limited in the Y-axis direction while securing a large capacitance by increasing the dimension T of the ceramic body 11.

In the multilayer ceramic capacitor 10, the dimension L in the X-axis direction of the ceramic body 11 is only required to be larger than the dimension W and may be smaller than the dimension T. In the multilayer ceramic capacitor 10, the dimensions T, W, and L of the ceramic body 11 can be freely determined within a range that satisfies the above conditions.

The first external electrode 14 has a first end-surface covering portion 14a and first extending portions 14b. The second external electrode 15 has a second end-surface covering portion 15a and second extending portions 15b. The end-surface covering portions 14a and 15a cover the end surfaces E1 and E2 of the ceramic body 11, respectively. The extending portions 14b and 15b extend from the respective end-surface covering portions 14a and 15a to the principal surfaces M1 and M2 and the side surfaces S1 and S2.

The extending portions 14b cover parts at the side of the end surface E1 of the principal surfaces M1 and M2 and the side surfaces S1 and S2, and the extending portions 15b cover parts at the side of the end surface E2 of the principal surfaces M1 and M2 and the side surfaces S1 and S2. That is, the extending portions 14b and 15b are spaced apart from each other on each of the principal surfaces M1 and M2 and the side surfaces S1 and S2. As a result, the external electrodes 14 and 15 have a U-shaped cross section parallel to the X-Z plane and a U-shaped cross section parallel to the X-Y plane.

The ceramic body 11 is formed of dielectric ceramic, and includes an electrode-stacked portion 16 and a pair of cover portions 17. The pair of the cover portions 17 cover the electrode-stacked portion 16 from respective sides in the Z-axis direction. That is, in the ceramic body 11, the pair of the cover portions 17 constitute the principal surfaces M1 and M2, and the electrode-stacked portion 16 and the pair of the cover portions 17 constitute the end surfaces E1 and E2 and the side surfaces S1 and S2.

The ceramic body 11 has a structure in which a plurality of flat plate-shaped ceramic layers 18 extending along the X-Y plane are stacked in the Z-axis direction. The electrode-stacked portion 16 includes a plurality of sheet-like first and second internal electrodes 12 and 13 that are disposed between the plurality of the ceramic layers 18 and extend along the X-Y plane. The internal electrodes 12 and 13 are not disposed in the cover portions 17.

The internal electrodes 12 and 13 are alternately arranged along the Z-axis direction, and are opposed to each other in the Z-axis direction in an opposing section located in a center in the X-axis and Y-axis directions. The first internal electrodes 12 are led out from the opposing section to the first end surface E1 and are connected to the first external electrode 14. The second internal electrodes 13 are led out from the opposing section to the second end surface E2 and are connected to the second external electrode 15.

With this configuration, in the multilayer ceramic capacitor 10, when a voltage is applied between the external electrodes 14 and 15, the voltage is applied to the plurality of the ceramic layers 18 between the internal electrodes 12 and 13 in the opposing section. As a result, in the multilayer ceramic capacitor 10, electric charge corresponding to the voltage between the external electrodes 14 and 15 is stored.

In the high-height ceramic body 11, the capacitance can be increased by increasing the dimension in the Z-axis direction of the electrode-stacked portion 16 and increasing the number of the stacked internal electrodes 12 and 13. From this viewpoint, in the ceramic body 11, the total number of stacked layers, which is the sum of the number of the stacked internal electrodes 12 and the number of the stacked internal electrodes 13, is preferably 500 or more, and more preferably 700 or more.

In the ceramic body 11, dielectric ceramic having a high dielectric constant is used in order to increase the capacitance of each ceramic layer 18 between the internal electrodes 12 and 13. Examples of the dielectric ceramic having a high dielectric constant include, but are not limited to, materials having a perovskite structure containing barium (Ba) and titanium (Ti), typified by barium titanate ($BaTiO_3$).

The dielectric ceramic may be strontium titanate ($SrTiO_3$), calcium titanate ($CaTiO_3$), magnesium titanate ($MgTiO_3$), calcium zirconate ($CaZrO_3$), calcium zirconate titanate ($Ca(Zr, Ti)O_3$), barium calcium zirconate titanate ($(Ba, Ca)(Zr, Ti)O_3$), barium zirconate ($BaZrO_3$), or titanium dioxide ($TiO_2$).

In the multilayer ceramic capacitor 10, both the first and second external electrodes 14 and 15 are formed using copper (Cu) as a main component, and both the first and second internal electrodes 12 and 13 are formed using nickel (Ni) as a main component. In this embodiment, the main component refers to a component having the highest content ratio.

That is, in the multilayer ceramic capacitor 10, the external electrodes 14 and 15 mainly composed of Cu and the internal electrodes 12 and 13 mainly composed of Ni are connected at the end surfaces E1 and E2 of the ceramic body 11, respectively. The external electrodes 14 and 15 are configured as baked films on the ceramic body 11.

When the external electrodes 14 and 15 are baked onto the ceramic body 11, Cu in the external electrodes 14 and 15 diffuses into the internal electrodes 12 and 13 while reacting with Ni constituting the internal electrodes 12 and 13. That is, Ni constituting the end portions in the X-axis direction led out to the respective end surfaces E1 and E2 of the internal electrodes 12 and 13 reacts with Cu to form a copper-nickel alloy.

Thus, in the internal electrodes 12 and 13, the end portions in the X-axis direction led out to the end surfaces E1 and E2 expand because of the diffusion of Cu. Therefore, in the ceramic body 11, both end portions in the X-axis direction in which the internal electrodes 12 and 13 expand tend to expand in the Z-axis direction, so that internal stress is generated.

In the ceramic body 11, an internal stress caused in the Z-axis direction by expansion of both end portions in the X-axis direction tends to concentrate on corner portions C. Here, as illustrated in FIG. 1, the corner portions C in the ceramic body 11 refer to eight portions that connect three surfaces, i.e., one of the principal surfaces M1 and M2, one of the end surfaces E1 and E2, and one of the side surfaces S1 and S2, to each other.

In particular, in the high-height ceramic body 11, since the force to expand in the Z-axis direction generated by the expansion of each of the internal electrodes 12 and 13 is increased because of the large number of the stacked internal electrodes 12 and 13, the internal stress concentrating in the corner portions C increases. In the ceramic body 11, cracks are more likely to be generated in the corner portions C as the internal stress concentrating in the corner portions C increases.

In the multilayer ceramic capacitor 10, when a crack is generated in the corner portion C of the ceramic body 11, the crack acts as a path through which moisture enters, and thus moisture resistance is likely to decrease. In addition, in the ceramic body 11, since the corner portions C are covered with the external electrodes 14 and 15, it is difficult to find a crack generated in the corner portion C by visual inspection.

Figure 4:
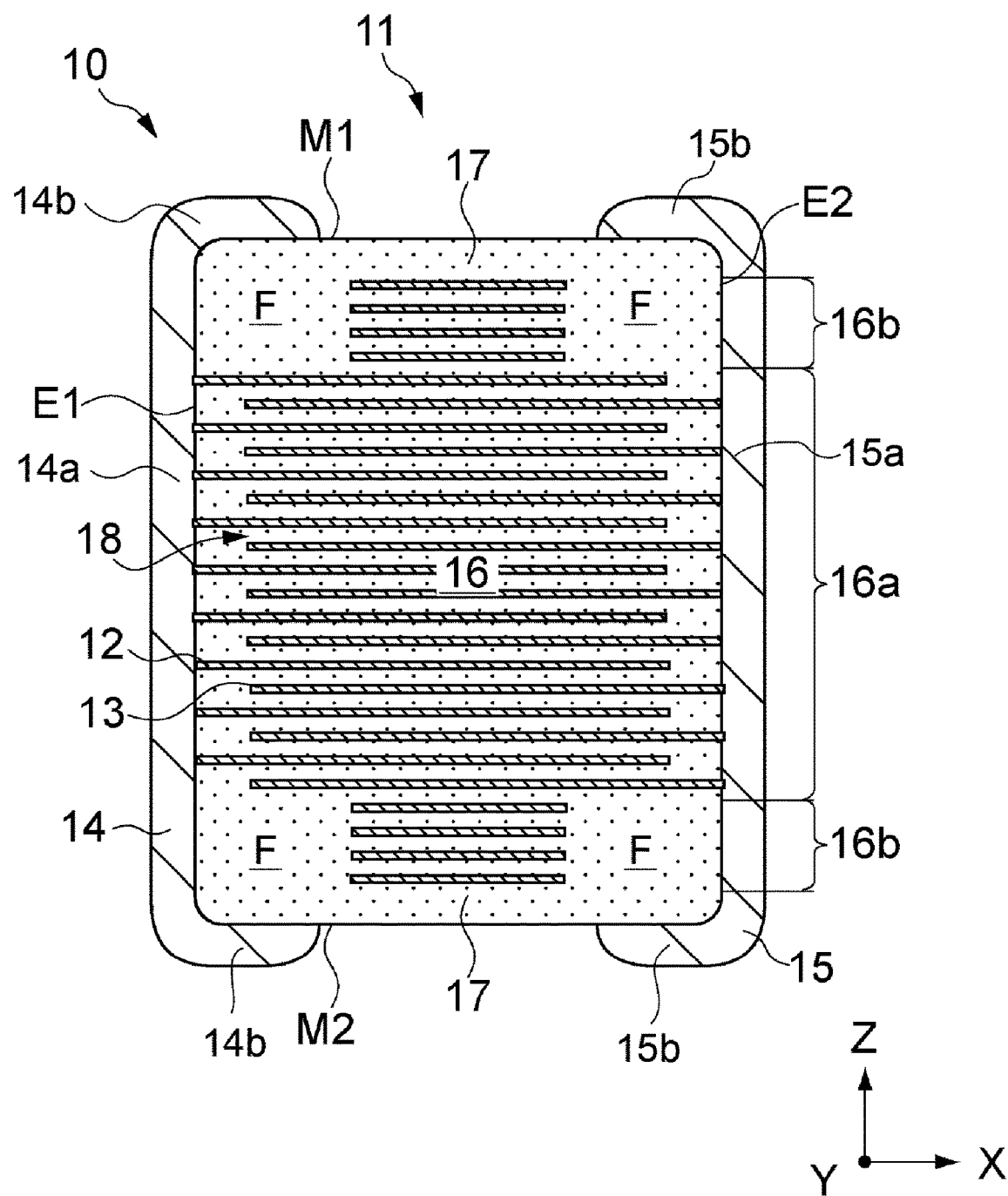
FIG. 4 is a cross-sectional view of the multilayer ceramic capacitor taken along line A2-A2' in FIG. 1.
Figure 5:
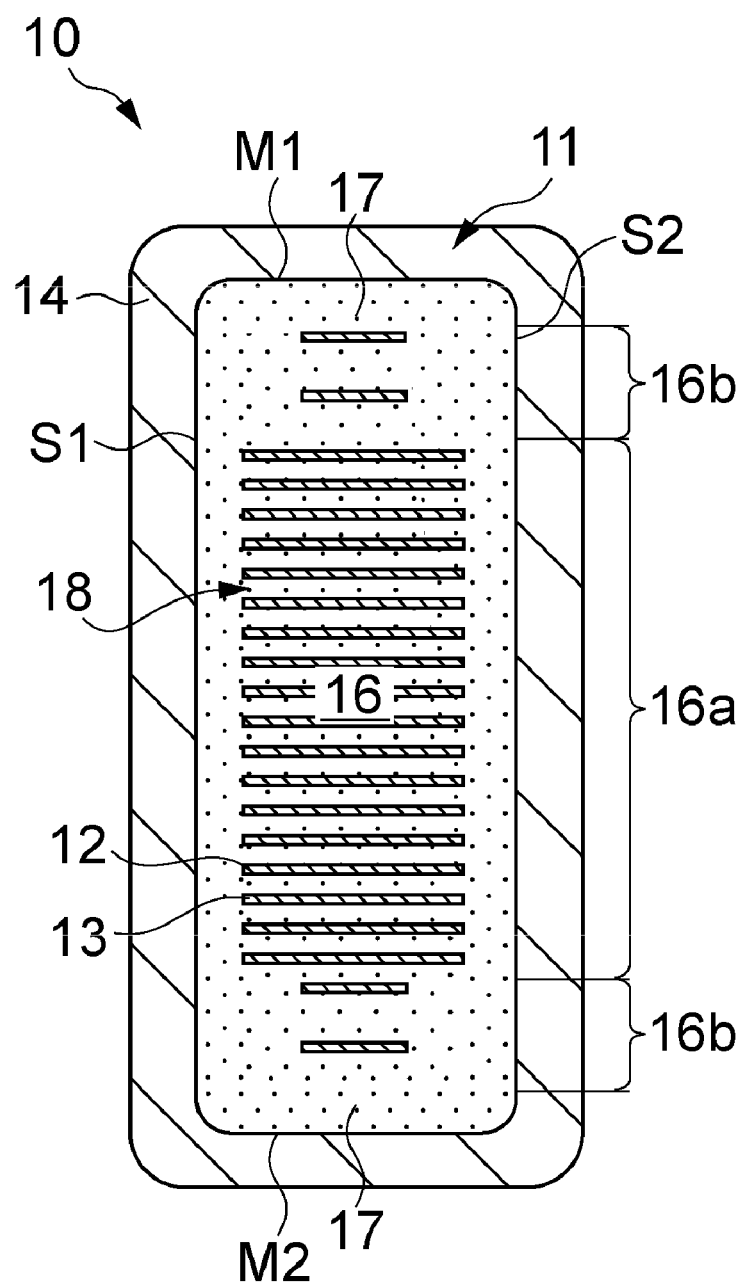
FIG. 5 is a cross-sectional view of the multilayer ceramic capacitor taken along line B2-B2' in FIG. 1.
Figure 5:
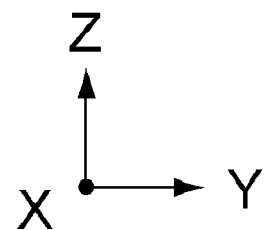

FIG. 4 is a cross-sectional view of the multilayer ceramic capacitor 10 taken along the line A2-A2' in FIG. 1. FIG. 5 is a cross-sectional view of the multilayer ceramic capacitor 10 taken along the line B2-B2' in FIG. 1. FIG. 4 and FIG. 5 each illustrate a longitudinal cross section of sections including the vicinities of the corner portions C of the ceramic body 11 in the multilayer ceramic capacitor 10.

In the multilayer ceramic capacitor 10, electrode-absence sections F in which the internal electrodes 12 and 13 are absent are provided in the vicinities of eight corner portions C of the ceramic body 11, which are end portions in the X-axis, Y-axis, and Z-axis directions in the electrode-stacked portion 16. That is, in the ceramic body 11, the internal electrodes 12 and 13 are made to be away from the corner portions C by providing the electrode-absence sections F.

Thus, in the ceramic body 11, the corner portions C are less likely to be affected by the internal electrodes 12 and 13. In addition, in the ceramic body 11, the electrode-absence sections F act to relax internal stresses generated by expansion of the internal electrodes 12 and 13. Accordingly, in the ceramic body 11, cracks are less likely to be generated in the corner portions C.

The electrode-stacked portion 16 is composed of an inner layer portion 16a and a pair of outer layer portions 16b, which are sections divided in the Z-axis direction. In the electrode-stacked portion 16, the pair of the outer layer portions 16b are adjacent to the pair of the cover portions 17, respectively, and the inner layer portion 16a is located between the pair of the outer layer portions 16b. In the electrode-stacked portion 16, the electrode-absence sections F are provided in each of the pair of the outer layer portions 16b.

The first and second internal electrodes 12 and 13 include first and second inner-layer internal electrodes 12a and 13a and first and second outer-layer internal electrodes 12b and 13b, respectively. That is, the first internal electrodes 12 include the first inner-layer internal electrodes 12a and the first outer-layer internal electrodes 12b, and the second internal electrodes 13 include the second inner-layer internal electrodes 13a and the second outer-layer internal electrodes 13b.

In the electrode-stacked portion 16, the first and second inner-layer internal electrodes 12a and 13a are stacked in the inner layer portion 16a, and the first and second outer-layer internal electrodes 12b and 13b are stacked in each of the pair of the outer layer portions 16b. That is, in the electrode-stacked portion 16, the electrode-absence sections F are formed by the first and second outer-layer internal electrodes 12b and 13b stacked in the pair of the outer layer portions 16b.

Figure 6A:
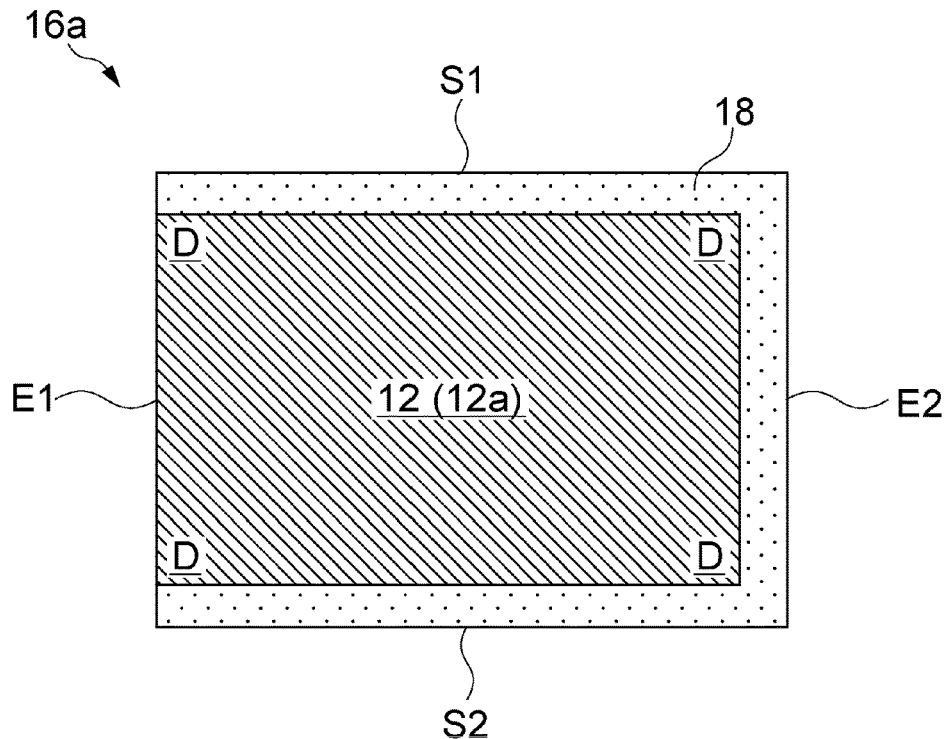
FIG. 6A and FIG. 6B are plan views of inner-layer internal electrodes of the multilayer ceramic capacitor.
Figure 6B:
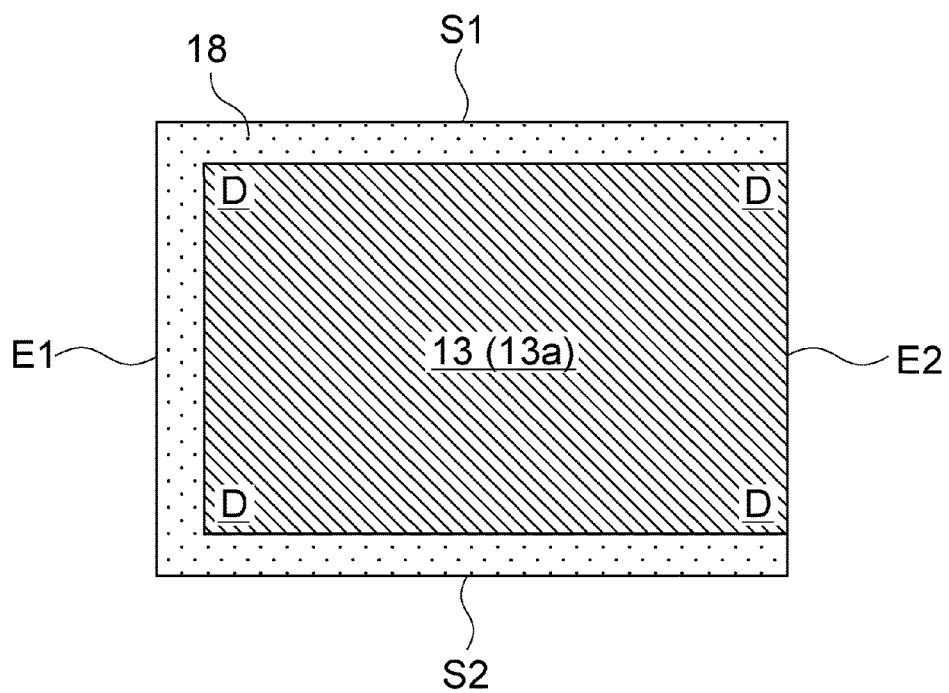

FIG. 6A and FIG. 6B are plan views illustrating the ceramic layers 18 on which the inner-layer internal electrodes 12a and 13a are formed in the inner layer portion 16a, respectively. In detail, FIG. 6A illustrates the ceramic layer 18 on which the first inner-layer internal electrode 12a is formed, and FIG. 6B illustrates the ceramic layer 18 on which the second inner-layer internal electrode 13a is formed.

As illustrated in FIG. 6A and FIG. 6B, the inner-layer internal electrodes 12a and 13a have the same planar shape. That is, the first inner-layer internal electrode 12a illustrated in FIG. 6A and the second inner-layer internal electrode 13a illustrated in FIG. 6B are in a positional relationship in which one of them is obtained by horizontally reversing the other of them about the central axis passing through the center of the ceramic layer 18 in the X-axis direction and being parallel to the Y-axis.

The inner-layer internal electrodes 12a and 13a each have a rectangular planar shape defined by four corner portions D, and are spaced apart from the side surfaces S1 and S2. The first inner-layer internal electrode 12a is spaced apart from the second end surface E2, and the second inner-layer internal electrode 13a is spaced apart from the first end surface E1.

Figure 7A:
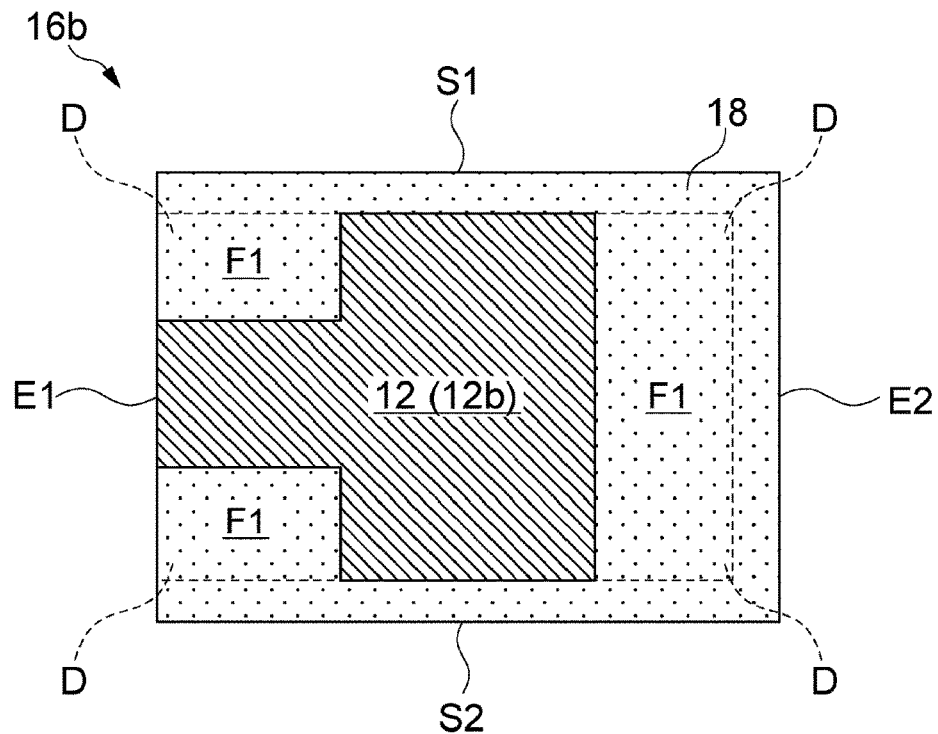
FIG. 7A and FIG. 7B are plan views of outer-layer internal electrodes of the multilayer ceramic capacitor.
Figure 7B:
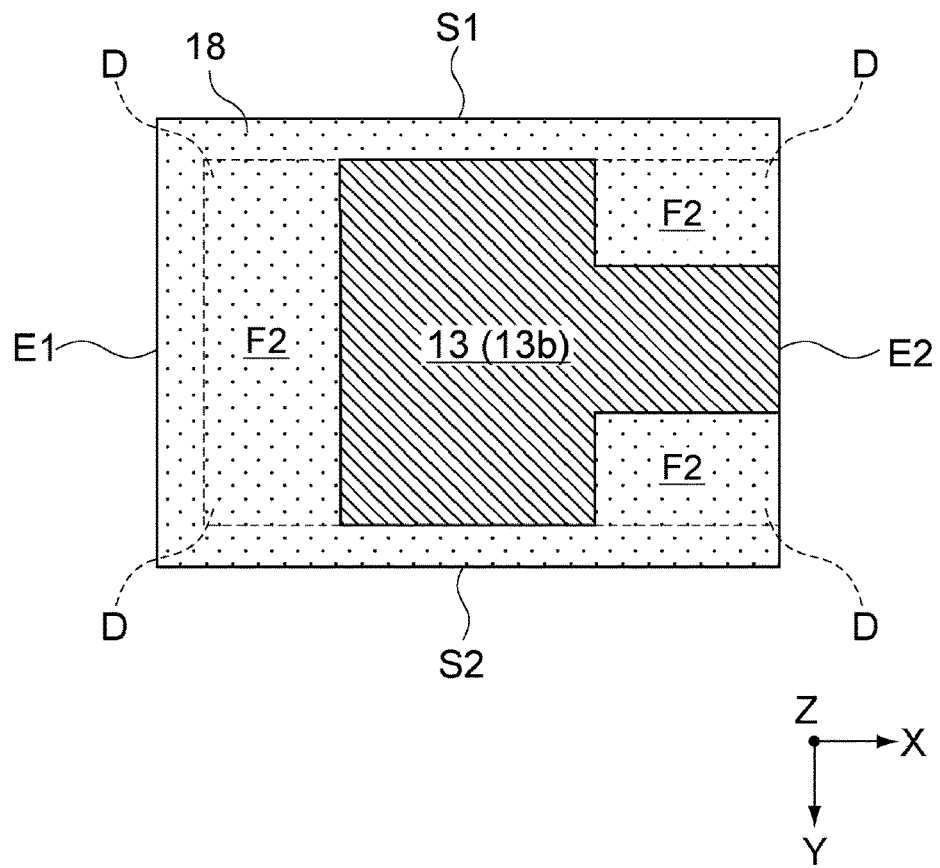

FIG. 7A and FIG. 7B are plan views illustrating the ceramic layers 18 on which the outer-layer internal electrodes 12b and 13b are formed in the outer layer portion 16b, respectively. Specifically, FIG. 7A illustrates the ceramic layer 18 on which the first outer-layer internal electrode 12b is formed, and FIG. 7B illustrates the ceramic layer 18 on which the second outer-layer internal electrode 13b is formed.

As illustrated in FIG. 7A and FIG. 7B, the outer-layer internal electrodes 12b and 13b have the same planar shape. That is, the first outer-layer internal electrode 12b illustrated in FIG. 7A and the second outer-layer internal electrode 13b illustrated in FIG. 7B have a positional relationship in which one of them is obtained by horizontally reversing the other of them about the central axis that passes through the center in the X-axis direction of the ceramic layer 18 and is parallel to the Y-axis.

In FIG. 7A and FIG. 7B, the outlines of the inner-layer internal electrodes 12a and 13a are indicated by broken lines. The outer-layer internal electrodes 12b and 13b stacked in the outer layer portion 16b are provided so as not to have portions corresponding to the four corner portions D of the inner-layer internal electrodes 12a and 13a, thereby avoiding the vicinities of the corner portions C of the ceramic body 11.

That is, in the outer-layer internal electrodes 12b and 13b, sections including portions corresponding to the four corner portions D of the inner-layer internal electrodes 12a and 13a are defined as first and second electrode-absence sections F1 and F2. In the ceramic body 11, the first and second electrode-absence sections F1 and F2 provided in the outer-layer internal electrodes 12b and 13b constitute the electrode-absence sections F in the pair of the outer-layer portions 16b.

The widths in the Y-axis direction of the outer-layer internal electrodes 12b and 13b are both equal to that of the center portion in the X-axis direction of the first inner-layer internal electrode 12a. In each of the outer-layer internal electrodes 12b and 13b, the electrode-absence sections F1 and F2 including portions corresponding to the four corner portions D of the inner-layer internal electrodes 12a and 13a are provided on both sides of the center portion in the X-axis direction.

In the portion at the side of the first end surface E1 of the first outer-layer internal electrode 12b, the first electrode-absence sections F1 are provided at both end portions in the Y-axis direction, and only the center portion in the Y-axis direction is led out to the first end surface E1 and connected to the first external electrode 14. Thus, the first outer-layer internal electrode 12b has a planar shape narrowed in the Y-axis direction at the side of the first end surface E1.

In the portion at the side of the second end surface E2 of the second outer-layer internal electrode 13b, the second electrode-absence sections F2 are provided at both end portions in the Y-axis direction, and only the center portion in the Y-axis direction is led out to the second end surface E2 and connected to the second external electrode 15. Thus, the second outer-layer internal electrode 13b has a planar shape narrowed in the Y-axis direction at the side of the second end surface E2.

In the first outer-layer internal electrode 12b, the entire portion at the side of the second end surface E2 is configured as the first electrode-absence section F1. In the second outer-layer internal electrode 13b, the entire portion at the side of the first end surface E1 is configured as the second electrode-absence section F2. Thus, the dimensions in the X-axis direction of the outer-layer internal electrodes 12b and 13b are smaller than those of the inner-layer internal electrodes 12a and 13a.

As illustrated in FIG. 4, in the outer layer portion 16b of the electrode-stacked portion 16, the electrode-absence sections F are provided in the entire sections in the X-axis direction opposed to the extending portions 14b and 15b of the external electrodes 14 and 15 in the Z-axis direction. In other words, in the outer-layer internal electrodes 12b and 13b, the electrode-absence sections F1 and F2 extend to positions further inward than the extending portions 14b and 15b in the X-axis direction.

That is, the first outer-layer internal electrode 12b is narrowed in the Y-axis direction in the entire region opposed to the first extending portion 14b in the Z-axis direction, and is not opposed to the second extending portion 15b in the Z-axis direction in the vicinities of the corner portions C. Further, the second outer-layer internal electrode 13b is narrowed in the Y-axis direction in the entire region opposed to the second extending portion 15b in the Z-axis direction, and is not opposed to the first extending portion 14b in the Z-axis direction in the vicinities of the corner portions C.

With such a configuration, in the multilayer ceramic capacitor 10, it is possible to inhibit cracks from being generated in the entire portions covered with the external electrodes 14 and 15 in the ceramic body 11. Therefore, in the multilayer ceramic capacitor 10, it is possible to inhibit the occurrence of a defect whose cause is difficult to investigate by visual inspection.

Further, in the first outer-layer internal electrode 12b, the dimension in the Y-axis direction in the region opposed to the first extending portion 14b in the Z-axis direction is preferably equal to or less than two-thirds of the dimension in the Y-axis direction of the first inner-layer internal electrode 12a. This configuration more effectively inhibits cracks from being generated in the portion covered with the first external electrode 14 in the ceramic body 11.

In the second outer-layer internal electrode 13b, the dimension in the Y-axis direction in the region opposed to the second extending portion 15b in the Z-axis direction is preferably equal to or less than two-thirds of the dimension in the Y-axis direction of the second inner-layer internal electrode 13a. This configuration more effectively inhibits cracks from being generated in the portion covered with the second external electrode 15 in the ceramic body 11.

In the ceramic body 11, as the dimension in the Z-axis direction of each outer layer portion 16b in the electrode-stacked portion 16 is increased, the generation of cracks will be more likely to be inhibited, but it will be more difficult to obtain a large capacitance. From this viewpoint, the dimension in the Z-axis direction of each outer layer portion 16b is preferably equal to or greater than 5% of and equal to or less than 25% of the dimension T of the ceramic body 11 in the Z-axis direction.

Method of Manufacturing the Multilayer Ceramic Capacitor 10

Figure 8:
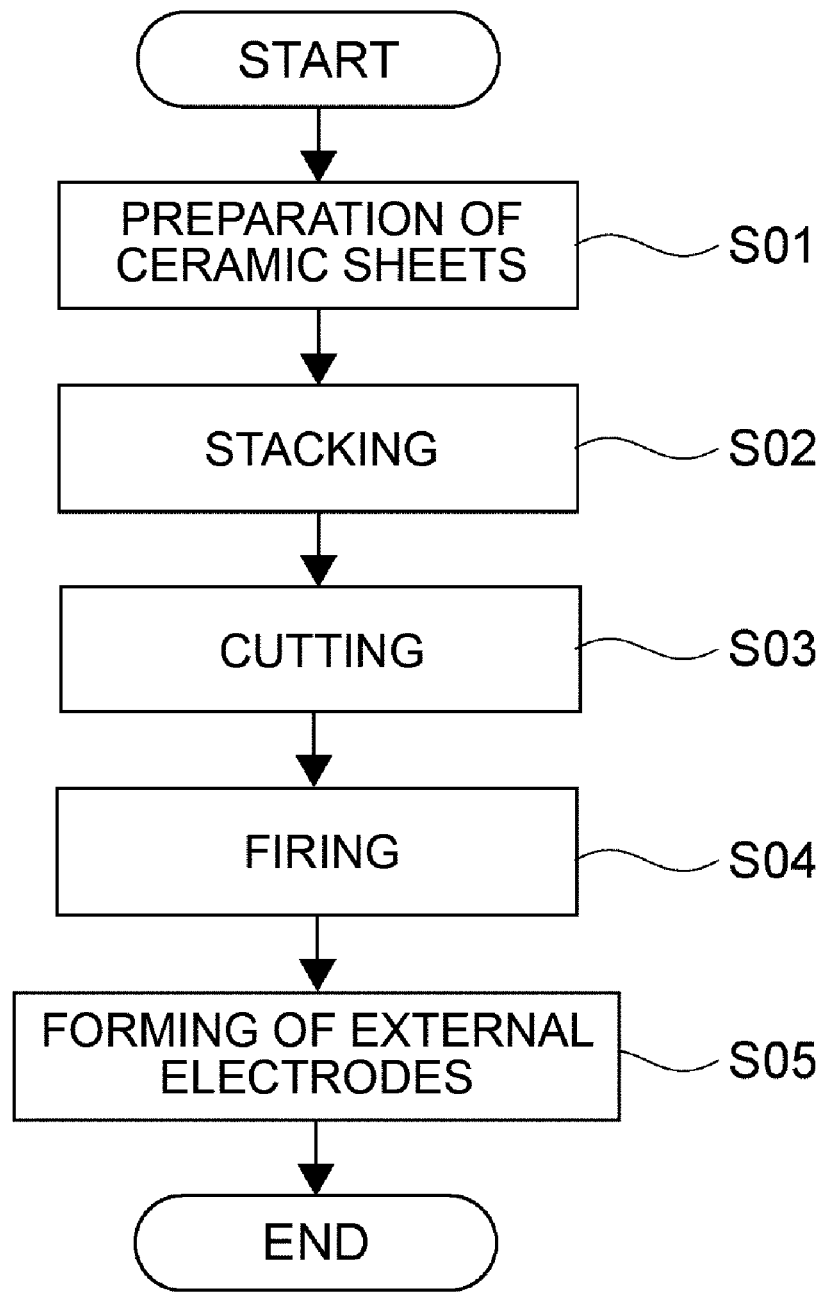
FIG. 8 is a flowchart illustrating a method of manufacturing the multilayer ceramic capacitor.

FIG. 8 is a flowchart illustrating a method of manufacturing the multilayer ceramic capacitor 10 in accordance with the present embodiment. FIG. 9A to FIG. 13 illustrate a manufacturing process of the multilayer ceramic capacitor 10. Hereinafter, the method of manufacturing the multilayer ceramic capacitor 10 will be described along FIG. 8 with reference to FIG. 9A to FIG. 13 as appropriate.

(Step S01: Preparation of Ceramic Sheets)

In step S01, first and second inner-layer ceramic sheets 101a and 102a for forming the inner layer portion 16a of the electrode-stacked portion 16, first and second outer-layer ceramic sheets 101b and 102b for forming a pair of the outer layer portions 16b of the electrode-stacked portion 16, and cover ceramic sheets 103 for forming the cover portions 17 are prepared.

Each of the ceramic sheets 101a, 101b, 102a, 102b, and 103 is configured as an unfired dielectric green sheet containing dielectric ceramic as a main component. The ceramic sheets 101a, 101b, 102a, 102b, and 103 are formed into sheets using, for example, a roll coater or a doctor blade.

Figure 9A:
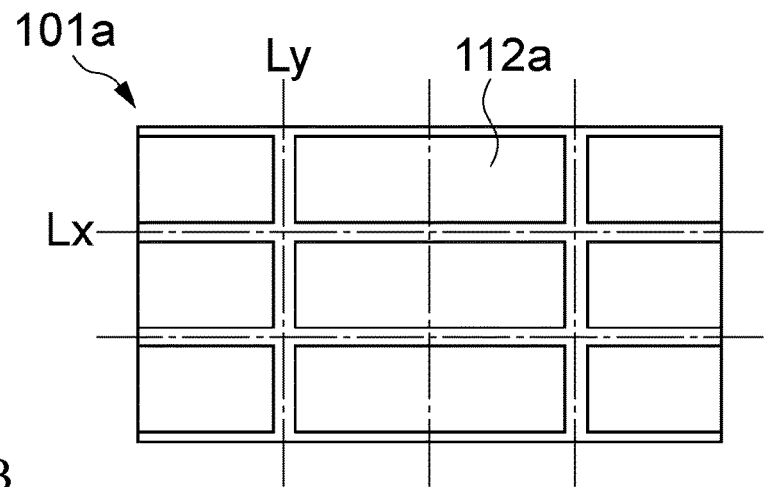
FIG. 9A and FIG. 9B are plan views of inner-layer ceramic sheets prepared in step S01.
Figure 9B:
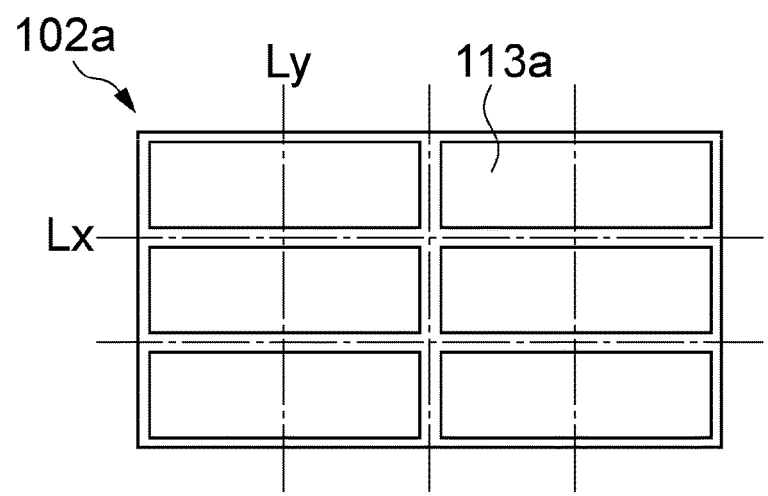
Figure 9B:
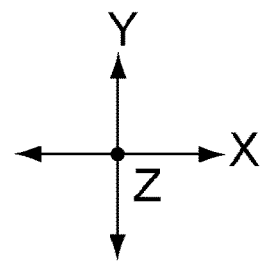
Figure 10A:
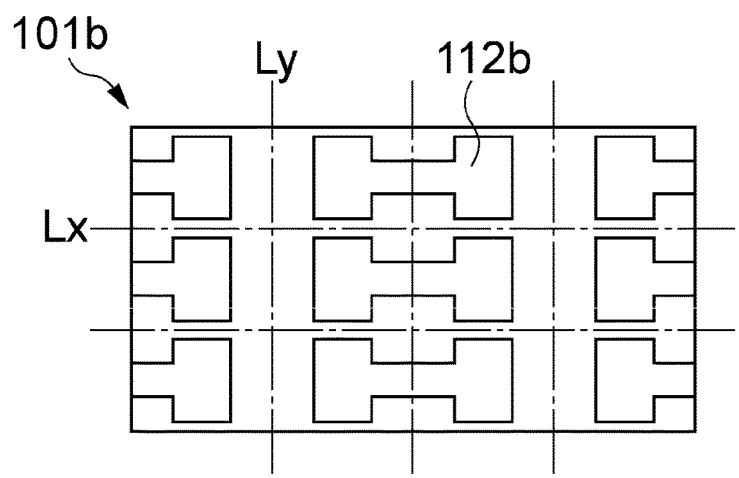
FIG. 10A and FIG. 10B are plan views of outer-layer ceramic sheets prepared in step S01.
Figure 10B:
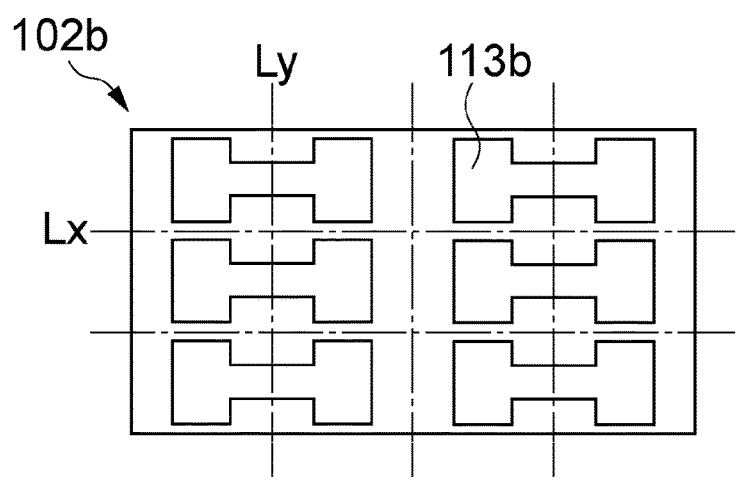
Figure 10B:
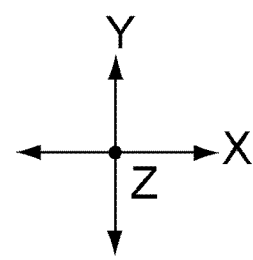
Figure 11:
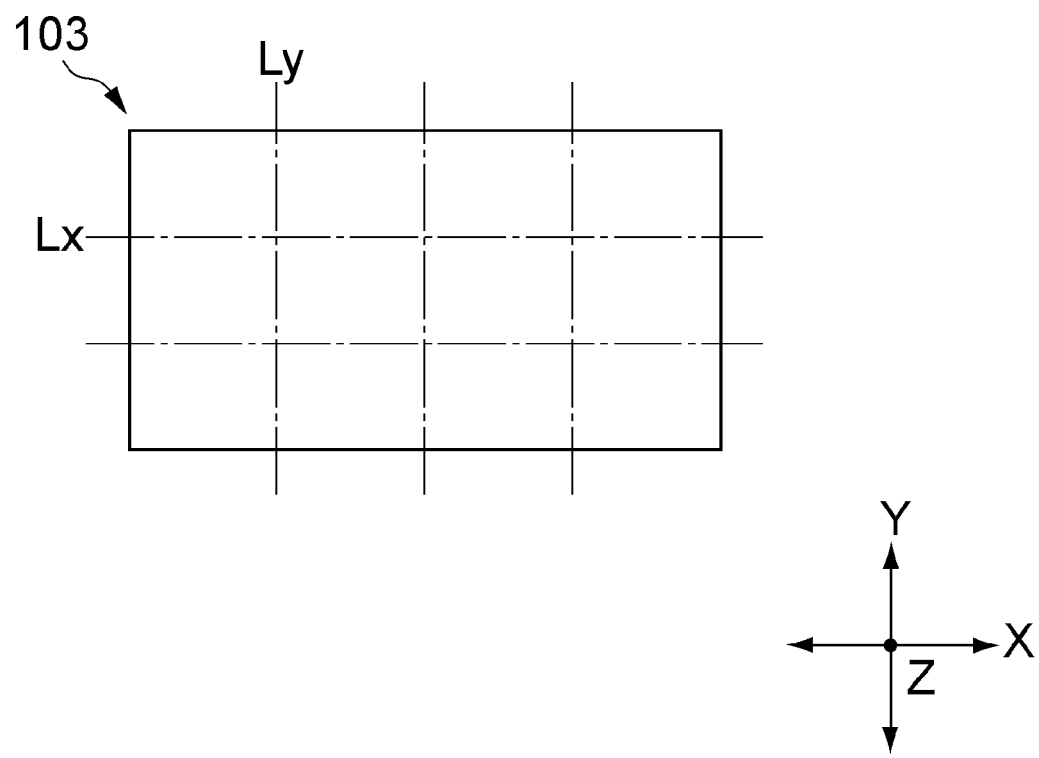
FIG. 11 is a plan view of a cover ceramic sheet prepared in step S01.

FIG. 9A is a plan view of the first inner-layer ceramic sheet 101a. FIG. 9B is a plan view of the second inner-layer ceramic sheet 102a. FIG. 10A is a plan view of the first outer-layer ceramic sheet 101b. FIG. 10B is a plan view of the second outer-layer ceramic sheet 102b. FIG. 11 is a plan view of the cover ceramic sheet 103.

At this stage, each of the ceramic sheets 101a, 102a, 101b, 102b, and 103 is configured as a large-sized sheet that has not been separated into pieces. In FIG. 9A to FIG. 11, first cutting lines Lx parallel to the X-axis and second cutting lines Ly parallel to the Y-axis are indicated by chain lines as cutting lines for separating a multilayer sheet into individual multilayer ceramic capacitors 10.

On the inner-layer ceramic sheets 101a and 102a, unfired conductor patterns 112a and 113a corresponding to the inner-layer internal electrodes 12a and 13a are formed, respectively. On the outer-layer ceramic sheets 101b and 102b, unfired conductor patterns 112b and 113b corresponding to the outer-layer internal electrodes 12b and 13b are formed, respectively.

An unfired conductor pattern is not formed on the cover ceramic sheet 103 corresponding to the cover portion 17 in which no internal electrode is provided. The composition of the cover ceramic sheet 103 corresponding to the cover portion 17 that does not contribute to formation of electrostatic capacity may be different from those of the ceramic sheets 101a, 102a, 101b, and 102b.

The conductor patterns 112a, 113a, 112b, and 113b are formed by applying a Ni-based conductive paste to the ceramic sheets 101a, 102a, 101b, and 102b, respectively. A method of applying the conductive paste can be freely selected from known techniques, and for example, a screen printing method or a gravure printing method can be used.

In each of the conductor patterns 112a and 112b and the conductor patterns 113a and 113b, a gap in the X-axis direction along the cut line Ly is formed every other cut line Ly1. In The gaps in the conductor patterns 112a and 113a are alternately arranged along the X-axis direction, and the gaps in the conductor patterns 112b and 113b are alternately arranged along the X-axis direction.

(Step S02: Stacking)

Figure 12:
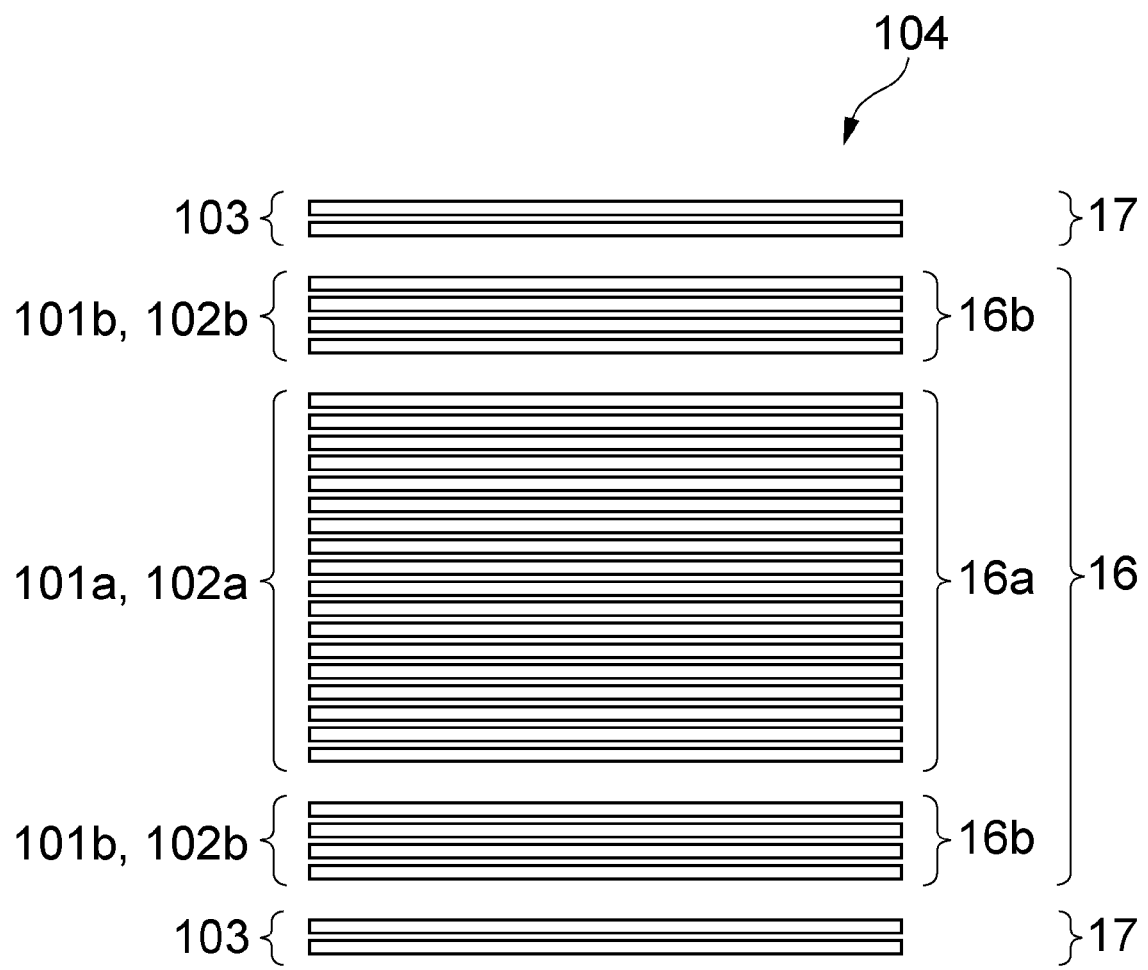
FIG. 12 schematically illustrates step S02.

In step S02, the ceramic sheets 101a, 102a, 101b, 102b, and 103 prepared in step S01 are stacked as illustrated in FIG. 12 to produce a multilayer sheet 104. In FIG. 12, the ceramic sheets 101a, 102a, 101b, 102b, and 103 are illustrated separated from each other for convenience sake.

In the multilayer sheet 104, the inner-layer ceramic sheets 101a and 102a are alternately stacked in the Z-axis direction in a position corresponding to the inner layer portion 16a of the electrode-stacked portion 16. In the multilayer sheet 104, the outer-layer ceramic sheets 101b and 102b are alternately stacked in the Z-axis direction at positions corresponding to the outer layer portions 16b of the electrode-stacked portion 16.

In the multilayer sheet 104, the cover ceramic sheets 103 corresponding to the cover portion 17 are stacked from both upper and lower sides in the Z-axis direction of the ceramic sheets 101a, 102a, 101b, and 102b stacked in a position corresponding to the electrode-stacked portion 16. The cover ceramic sheets 103 are continuously stacked in a number corresponding to the thickness of the cover portion 17.

(Step S03: Cutting)

Figure 13:
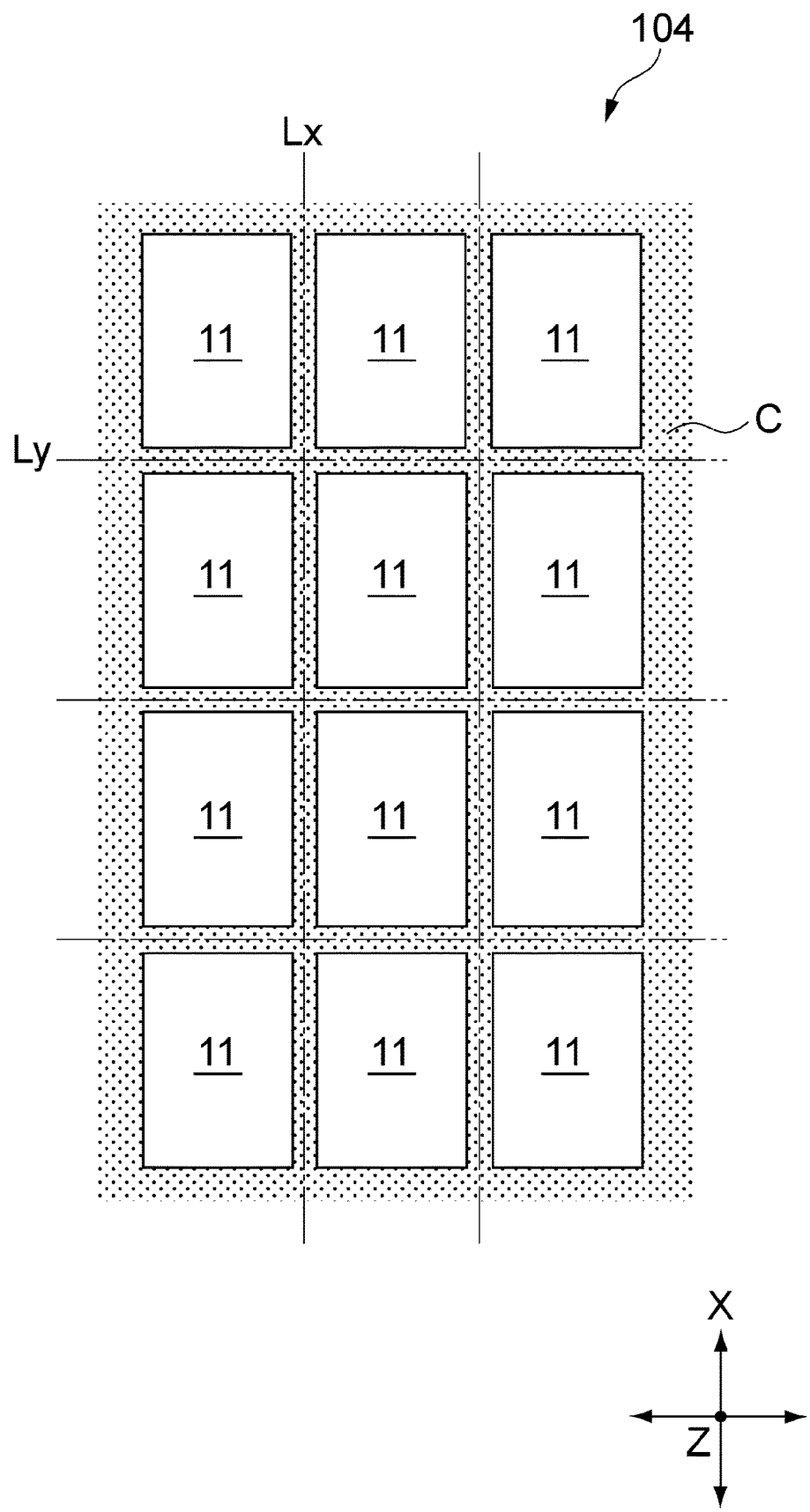
FIG. 13 is a plan view illustrating step S03.

In step S03, the multilayer sheet 104 obtained in step S02 is cut along the cut lines Lx and Ly as illustrated in FIG. 13, thereby obtaining unfired ceramic bodies 11. In order to cut the multilayer sheet 104 in step S03, for example, a cutting device provided with a press cutting blade, a dicing machine provided with a rotary blade, or the like can be used.

(Step S04: Firing)

In step S04, the ceramic body 11 obtained in step S03 is fired. The firing temperature in step S04 can be about 1000° C. to 1300° C. when a barium titanate ($BaTiO_3$)-based material is used, for example. The firing can be performed, for example, in a reducing atmosphere or a low oxygen partial pressure atmosphere.

(Step S05: Forming of External Electrodes)

In step S05, the external electrodes 14 and 15 are formed on respective end in the X-axis direction of the ceramic body 11 obtained in step S04, thereby producing the multilayer ceramic capacitor 10 illustrated in FIG. 1 to FIG. 3. The external electrodes 14 and 15 are formed by applying conductive pastes containing Cu as a main component to the ceramic body 11 and baking the conductive pastes.

In step S05, Cu in the conductive paste diffuses into the internal electrodes 12 and 13 while reacting with Ni constituting the internal electrodes 12 and 13. However, as described above, in the ceramic body 11, even when the internal electrodes 12 and 13 expand because of diffusion of Cu, the action of the electrode-absence sections F provided in the outer layer portions 16b inhibits cracks from being generated.

Other Configuration Examples of the Outer Layer Portion 16b

In the ceramic body 11, the configurations of the outer-layer internal electrodes 12b and 13b are not limited to the above as long as the electrode-absence section F in which the outer-layer internal electrodes 12b and 13b are absent is provided in the vicinity of each of the corner portions C in the outer layer portion 16b. In the following description, the first and second electrode-absence sections F1 and F2 are collectively referred to as the electrode-absence section F.

Figure 14:
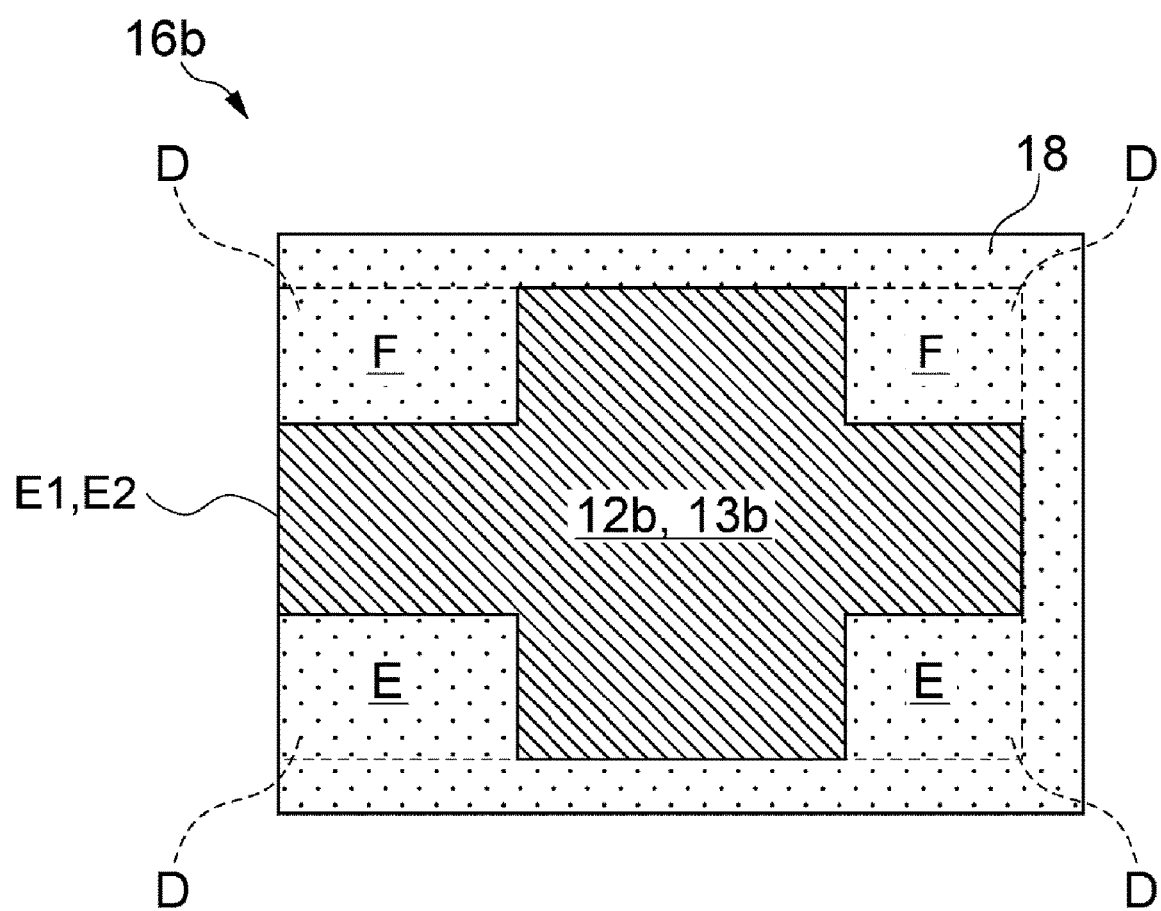
FIG. 14 is a plan view illustrating another embodiment of the outer-layer internal electrode of the multilayer ceramic capacitor.

For example, in the outer-layer internal electrodes 12b and 13b, as illustrated in FIG. 14, the electrode-absence sections F may be provided in both end portions in the Y-axis direction of the end portion in the X-axis direction at the side opposite to the side let out to the end surface E1 or E2. That is, the outer-layer internal electrodes 12b and 13b may have a planar shape narrowed in the Y-axis direction at both sides in the X-axis direction.

Figure 15:
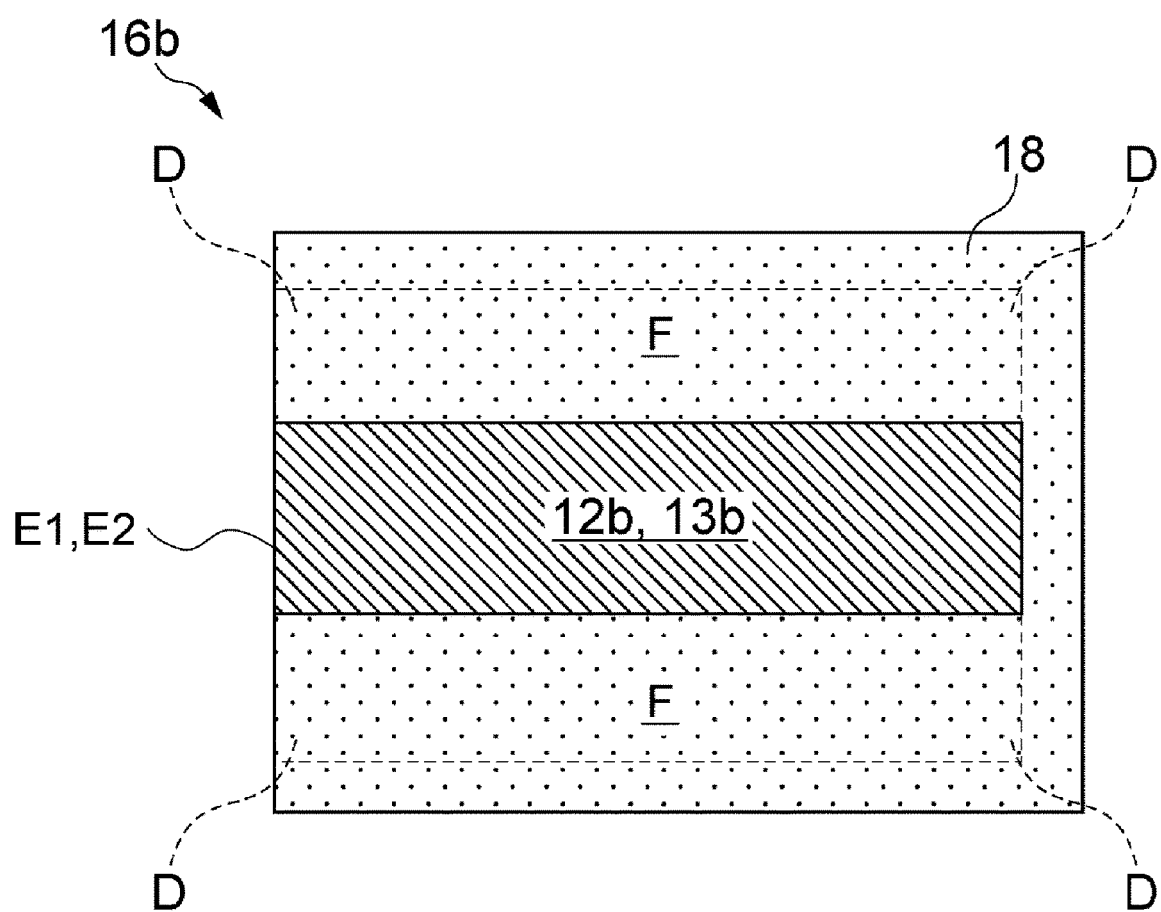
FIG. 15 is a plan view illustrating another embodiment of the outer-layer internal electrode of the multilayer ceramic capacitor.

Alternatively, in the outer-layer internal electrodes 12b and 13b, as illustrated in FIG. 15, the electrode-absence sections F may be provided across the entire region in the X-axis direction at both end portions in the Y-axis direction. Therefore, in the ceramic body 11, it is possible to inhibit the generation of cracks across the entire ridge sections extending in the X-axis direction and connecting the principal surfaces M1 and M2 and the side surfaces S1 and S2.

Furthermore, in the ceramic body 11, the electrode-absence section F is preferably provided in the vicinity of each of the eight corner portions C as described above. However, as long as the electrode-absence section F is provided in the vicinity of at least one of the eight corner portions C, an effect of inhibiting the generation of cracks in the corner portion C near which the electrode-absence section F is provided is obtained.

Figure 16:
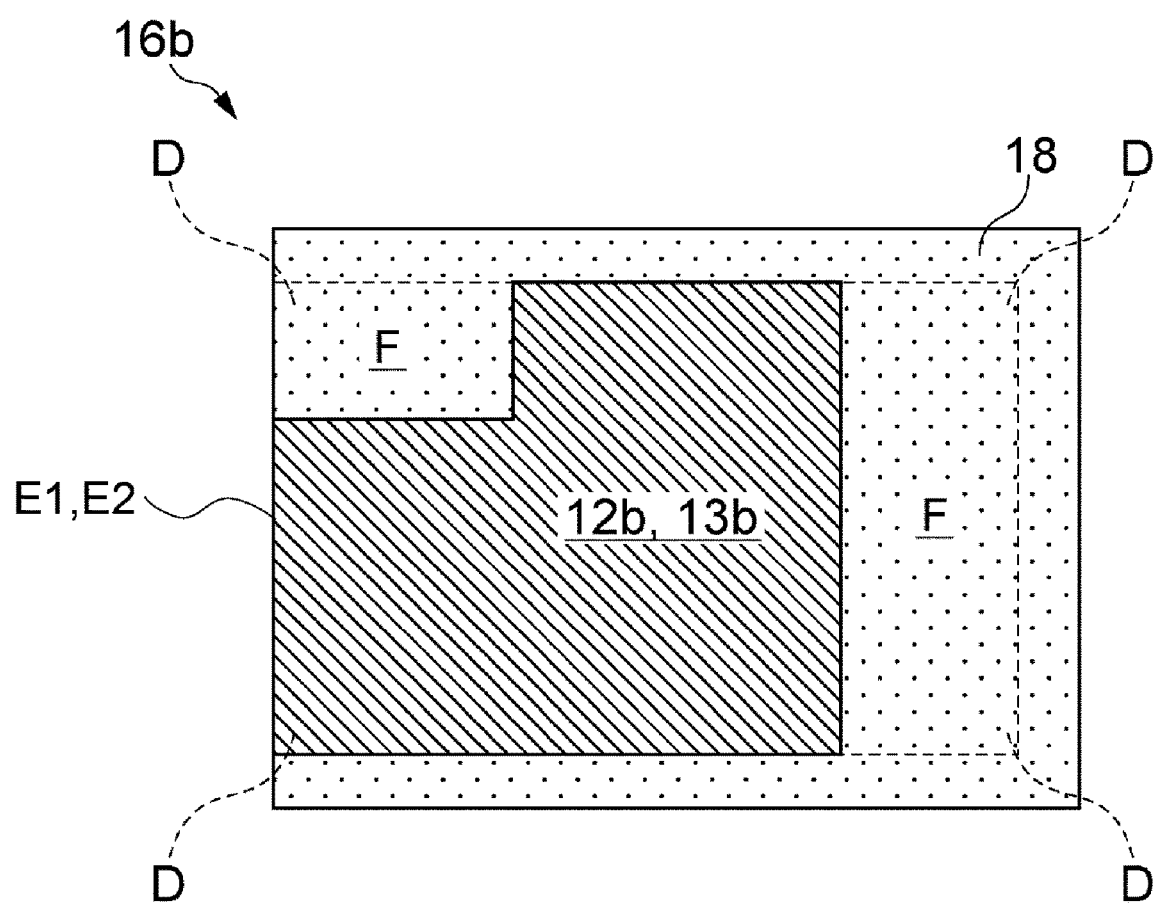
FIG. 16 is a plan view illustrating another embodiment of the outer-layer internal electrode of the multilayer ceramic capacitor.

That is, in the outer-layer internal electrodes 12b and 13b, it is only required that the electrode-absence section F is provided at a position corresponding to at least one of the four corner portions D of each of the inner-layer internal electrodes 12a and 13a. For example, in the outer-layer internal electrodes 12b and 13b, as illustrated in FIG. 16, the electrode-absence section F may not be necessarily provided on one side in the Y-axis direction of the end portion in the X-axis direction led out to the end surface E1 or E2.

Examples

As Examples 1 to 4, 100 samples of the multilayer ceramic capacitor 10 in accordance with the above embodiment were prepared. Among the samples of Examples 1 to 4, the configurations of the outer-layer internal electrodes 12b and 13b are different from each other, and the configurations other than the outer-layer internal electrodes 12b and 13b are the same.

In each of Examples 1 to 4, the dimension L of the ceramic body 11 was 0.62 mm, the dimension W was 0.33 mm, and the dimension T was 0.55 mm. That is, the dimension T of the ceramic body 11 was 1.7 times the dimension W. In each of Examples 1 to 4, the thicknesses of the electrode-stacked portion 16 was 500 µm, the thicknesses of each of the cover portions 17 was 25 µm, and the dimensions in the X-axis direction of the extending portions 14b and 15b of the external electrodes 14 and 15 were 0.15 mm.

Further, in each of Examples 1 to 4, the thickness of each of the internal electrodes 12 and 13 and the thickness of the ceramic layer 18 were about 0.5 µm. In addition, in each of Examples 1 to 4, the inner-layer internal electrodes 12a and 13a had the same rectangular planar shape, and the dimensions of the inner-layer internal electrodes 12a and 13a in the Y-axis direction were 0.3 µm.

In each of Examples 1 to 4, the total number of the internal electrodes 12 and 13 that were stacked was 500. More specifically, in each of Examples 1 to 4, the total number of the stacked inner-layer internal electrodes 12a and 13a in the inner layer portion 16a was 400, and the total number of the stacked outer-layer internal electrodes 12b and 13b in each of the pair of the outer layer portions 16b was 50.

In Example 1, the outer-layer internal electrodes 12b and 13b were configured as illustrated in FIG. 7. In Example 2, the outer-layer internal electrodes 12b and 13b were configured as illustrated in FIG. 14. In Example 3, the outer-layer internal electrodes 12b and 13b were configured as illustrated in FIG. 15. In Example 4, the outer-layer internal electrodes 12b and 13b were configured as illustrated in FIG. 16.

In Examples 1, 2, and 4, the dimensions in the Y-axis direction of the center portions in the X-axis direction of the outer-layer internal electrodes 12b and 13b were 0.3 µm. For the outer-layer internal electrodes 12b and 13b, the dimensions in the Y-axis direction of the end portions in the X-axis direction led out to the respective end surfaces E1 and E2 in Examples 1 and 4, the dimensions in the Y-axis direction of both end portions in the X-axis direction in Example 2, and the dimension in the Y-axis direction of the entire portion in Example 3 were 0.2 mm.

As Comparative Examples 1 and 2, 100 samples each having a configuration different from those of the multilayer ceramic capacitors 10 of the above embodiment were prepared. In the samples of Comparative Examples 1 and 2, all the internal electrodes 12 and 13 have the same configuration as the inner-layer internal electrodes 12a and 13a of the samples of Examples 1 to 4, that is, the outer-layer internal electrodes 12b and 13b are not provided.

Comparative Example 1 had the same configuration as Examples 1 to 4 except for the above configuration. Comparative Example 2 is different from Examples 1 to 4 in that the ceramic body 11 is not of a high-height type in addition to the above configuration. More specifically, the dimension T of the ceramic body 11 is 0.32 mm, that is, the dimension T of the ceramic body 11 is 1.0 times the dimension W.

Accordingly, in Comparative Example 2, the thickness of the electrode-stacked portion 16 was 270 µm, and the thickness of each cover portion 17 was 25 µm. In Comparative Example 2, the total number of the stacked internal electrodes 12 and 13 was 270. The sample of Comparative Example 2 had the same configuration as those of Examples 1 to 4 and Comparative Example 1 except for the configurations described above.

The samples of Examples 1 to 4 and Comparative Examples 1 and 2 were subjected to cross-sectional observation to check whether cracks were generated in the corner portions C of the ceramic body 11. In Examples 1 to 4, no cracks were observed in the corner portions C of the ceramic body 11 in all the samples, and it was confirmed that the effect of the present embodiment was obtained.

In Comparative Example 1, a crack was observed in any of the corner portions C of the ceramic body 11 in all the samples, and in Comparative Example 2, no crack was observed in all the corner portions C of the ceramic body 11 in all the samples. Thus, it was confirmed that the generation of cracks in the corner portions C of the ceramic body 11 is a problem specific to the high-height type.

Other Embodiments

Although the embodiments of the present invention have been described above, the present invention is not limited to the above embodiment, and various modifications can be made.

For example, in the ceramic body 11, the electrode-absence section F may not be necessarily provided in the entire section facing the extending portions 14b and 15b of the external electrodes 14 and 15 in the Z-axis direction in the pair of the outer layer portions 16b of the electrode-stacked portion 16, and the effect of the present embodiment can be obtained as long as the electrode-absence section F is provided in at least a part of the section facing each of the extending portions 14b and 15b in the Z-axis direction.

Further, in the multilayer ceramic capacitor 10 in accordance with the present disclosure, the above effect is obtained in a configuration in which the extending portions 14b and 15b of the external electrodes 14 and 15 are provided on at least the principal surfaces M1 and M2. Therefore, in the present invention, the extending portions 14b and 15b of the external electrodes 14 and 15 may not be necessarily provided on the side surface S1 or S2.

What is claimed is:
1. A multilayer ceramic capacitor comprising:
a ceramic body including an electrode-stacked portion and a pair of cover portions, the electrode-stacked portion having a plurality of first internal electrodes and a plurality of second internal electrodes, the plurality of first internal electrodes and the plurality of second internal electrodes being alternately stacked along a direction of a first axis, the plurality of first internal electrodes being led out to a first end surface of the ceramic body that is perpendicular to a second axis orthogonal to the first axis, the plurality of second internal electrodes being led out to a second end surface of the ceramic body that is perpendicular to the second axis, the plurality of first internal electrodes and the plurality of second internal electrodes containing Ni as a main component, the pair of cover portions covering the electrode-stacked portion from respective sides in the direction of the first axis and respectively constituting first and second principal surfaces of the ceramic body perpendicular to the first axis, a dimension in the direction of the first axis of the ceramic body being equal to or greater than 1.5 times a dimension in a direction of a third axis orthogonal to the first axis and the second axis;

first and second external electrodes that include first and second end-surface covering portions, first and second extending portions, and third and fourth extending portions, respectively, and contain Cu as a main component, the first and second end-surface covering portions covering the first and second end surfaces, respectively, of the ceramic body, the first extending portion extending from the first end-surface covering portion to the first and second principal surfaces of the ceramic body, and the second extending portion extending from the second end-surface covering portion to the first and second principal surfaces of the ceramic body, the third extending portion extending from the first end-surface covering portion to a first side surface and a second side surface of the ceramic body, the fourth extending portion extending from the second end-surface covering portion to the first side surface and the second side surface, the first side surface and the second side surface being perpendicular to the third axis, wherein the plurality of first internal electrodes include a first inner-layer internal electrode and a first outer-layer internal electrode, the first inner-layer internal electrode having a rectangular planar shape having four corners, the first outer-layer internal electrode having a maximum width in the direction of the third axis that is substantially the same as a width in the direction of the third axis of the first inner-layer internal electrode and being shaped so as to be absent at and adjacent to positions corresponding to at least two of four corners of the first inner-layer internal electrode in a plan view, wherein the plurality of second internal electrodes include a second inner-layer internal electrode and a second outer-layer internal electrode, the second inner-layer internal electrode having a rectangular planar shape having four corners, the second outer-layer internal electrode having a maximum width in the direction of the third axis that is substantially the same as a width in the direction of the third axis of the second inner-layer internal electrode and being shaped so as to be absent at and adjacent to positions corresponding to at least two of four corners of the second inner-layer internal electrode in the plan view, wherein the first and second inner-layer internal electrodes have the same rectangular planar shape with 180 degrees different orientations in the plan view, and the first and second outer-layer internal electrodes have the same planar shape with 180 degrees different orientations in the plan view, wherein the electrode-stacked portion includes a pair of outer layer portions that are adjacent to the pair of cover portions, respectively, in which the first and second outer-layer internal electrodes are stacked, and an inner layer portion positioned between the pair of outer layer portions in which the first and second inner-layer internal electrodes are stacked, wherein the ceramic body has substantially a rectangular parallelepiped shape with eight corners, each of the eight corners and adjacent portions thereof being covered with one of the first and second end-surface covering portions, one of the first and second extending portions, and one of the third and fourth extending portions, and wherein an orientation of the rectangular planar shape of the first and second inner-layer internal electrodes are aligned with an orientation of the rectangular parallelepiped shape of the ceramic body in the plan view.

2. The multilayer ceramic capacitor according to claim 1, wherein the first and second outer-layer internal electrodes are each shaped so as to be absent at and adjacent to each of positions corresponding to the four corners of the first and second inner-layer internal electrodes, respectively.

3. The multilayer ceramic capacitor according to claim 1,
wherein the first outer-layer internal electrode is shaped to have a relatively narrowed portion that is narrowed in the direction of the third axis in an entire region that overlaps with the first extending portion of the first external electrode in the direction of the first axis in the plan view, and
wherein the second outer-layer internal electrode is shaped to have a relatively narrowed portion that is narrowed in the direction of the third axis in an entire region that overlaps with the second extending portion of the second external electrode in the direction of the first axis in the plan view.

4. The multilayer ceramic capacitor according to claim 3,
wherein in the first outer-layer internal electrode, a dimension in the direction of the third axis of the relatively narrowed portion is equal to or less than two-thirds of that of the first inner-layer internal electrode, and
wherein in the second outer-layer internal electrode, a dimension in the direction of the third axis of the relatively narrowed portion is equal to or less than two-thirds of that of the second inner-layer internal electrode.

5. The multilayer ceramic capacitor according to claim 1,
wherein the first outer-layer internal electrode is shaped so as not to overlap with the second extending portion of the second external electrode in the direction of the first axis in the plan view, and
wherein the second outer-layer internal electrode is shaped so as not to overlap with the first extending portion of the first external electrode in the direction of the first axis in the plan view.

* * * * *